United States Patent
Ramos

(10) Patent No.: US 9,630,351 B2
(45) Date of Patent: Apr. 25, 2017

(54) PROCESS FOR TOOLING FOR MANUFACTURE OF A COMPOSITE PART COMPOSITE STOPPER OBTAINED BY SUCH A PROCESS OR SUCH TOOLING

(75) Inventor: Victor Ramos, Rambouillet (FR)

(73) Assignee: Albea Services, Le Signac, Gennevilliers (FR)

( * ) Notice: Subject to any disclaimer, the term of this patent is extended or adjusted under 35 U.S.C. 154(b) by 792 days.

(21) Appl. No.: 12/207,805

(22) Filed: Sep. 10, 2008

(65) Prior Publication Data
US 2009/0084753 A1    Apr. 2, 2009

(30) Foreign Application Priority Data
Sep. 28, 2007  (FR) ..................... 07 06819

(51) Int. Cl.
*B65D 41/02* (2006.01)
*B29C 45/14* (2006.01)

(52) U.S. Cl.
CPC .... *B29C 45/1418* (2013.01); *B29C 45/14344* (2013.01); *B65D 41/02* (2013.01); *B29C 2045/1436* (2013.01)

(58) Field of Classification Search
CPC ............... B65D 41/02; B29C 45/1418; B29C 45/14344; B29C 2045/1436; B29C 45/14024
USPC ........ 215/329, 341, 346, 305; 264/268, 250, 264/255, 266; 40/311
See application file for complete search history.

(56) References Cited

U.S. PATENT DOCUMENTS

| | | | | |
|---|---|---|---|---|
| 1,257,710 A | * | 2/1918 | Januchowsky | ............... 215/328 |
| 2,394,135 A | * | 2/1946 | Baar | .............................. 215/303 |
| 3,413,743 A | * | 12/1968 | Goodhue | ........................ 40/311 |
| 4,340,149 A | * | 7/1982 | Mori et al. | ..................... 215/343 |
| 4,379,512 A | * | 4/1983 | Ohmi et al. | .................. 215/327 |

(Continued)

FOREIGN PATENT DOCUMENTS

| DE | 4206244 A1 | 9/1993 |
|---|---|---|
| JP | 57 074137 | 5/1982 |

(Continued)

OTHER PUBLICATIONS

Plastipedia: Polypropylene (http://www.bpf.co.uk/plastipedia/polymers/pp.aspx). Aug. 2013.*

(Continued)

*Primary Examiner* — James N Smalley
(74) *Attorney, Agent, or Firm* — Banner & Witcoff, Ltd.

(57) ABSTRACT

This manufacturing process of a composite part (B), including a stamped body (11, 12) and an injected polymer material part (14), includes steps consisting of:
  a) placing a blank (1) of a body (11, 12) between a support (456) and a mold (31, 32), such that the said hollow part forms a pattern cavity (33) communicating with an opening (13) going through the blank (1);
  b) stamping the blank (1) using a punch (8);
  c) placing the holder (456) in a position in which it defines with the blank (1) at least one cavity (400) and in which there is at least one injection runner (50-60) leading to the said cavity (400).
  d) injecting the polymer material through the injection runner (50-60), said cavity (400) and said opening (13), so as to fill the said pattern cavity (33); and
  e) removing the composite part (B) from the mold.

12 Claims, 4 Drawing Sheets

(56) References Cited

U.S. PATENT DOCUMENTS

| | | | |
|---|---|---|---|
| 5,588,544 A | | 12/1996 | Takashima et al. |
| 5,839,593 A | * | 11/1998 | McKedy .................. 215/349 |
| 2002/0113032 A1 | * | 8/2002 | Blomdahl et al. ......... 215/341 |
| 2004/0245207 A1 | * | 12/2004 | Chomik .................. 215/343 |
| 2005/0061766 A1 | * | 3/2005 | Jochem .................. 215/305 |

FOREIGN PATENT DOCUMENTS

| | | |
|---|---|---|
| JP | 03161316 | 7/1991 |
| JP | 2001199460 | 7/2001 |

OTHER PUBLICATIONS

Plastemart: Thermoplastic Elastomers (http://www.plastemart.com/upload/Literature/injection_moulding_of_TPE_&_TPV.asp). Aug. 2013.*

French Application 0706819, Search Report, dated Jun. 17, 2008.

* cited by examiner

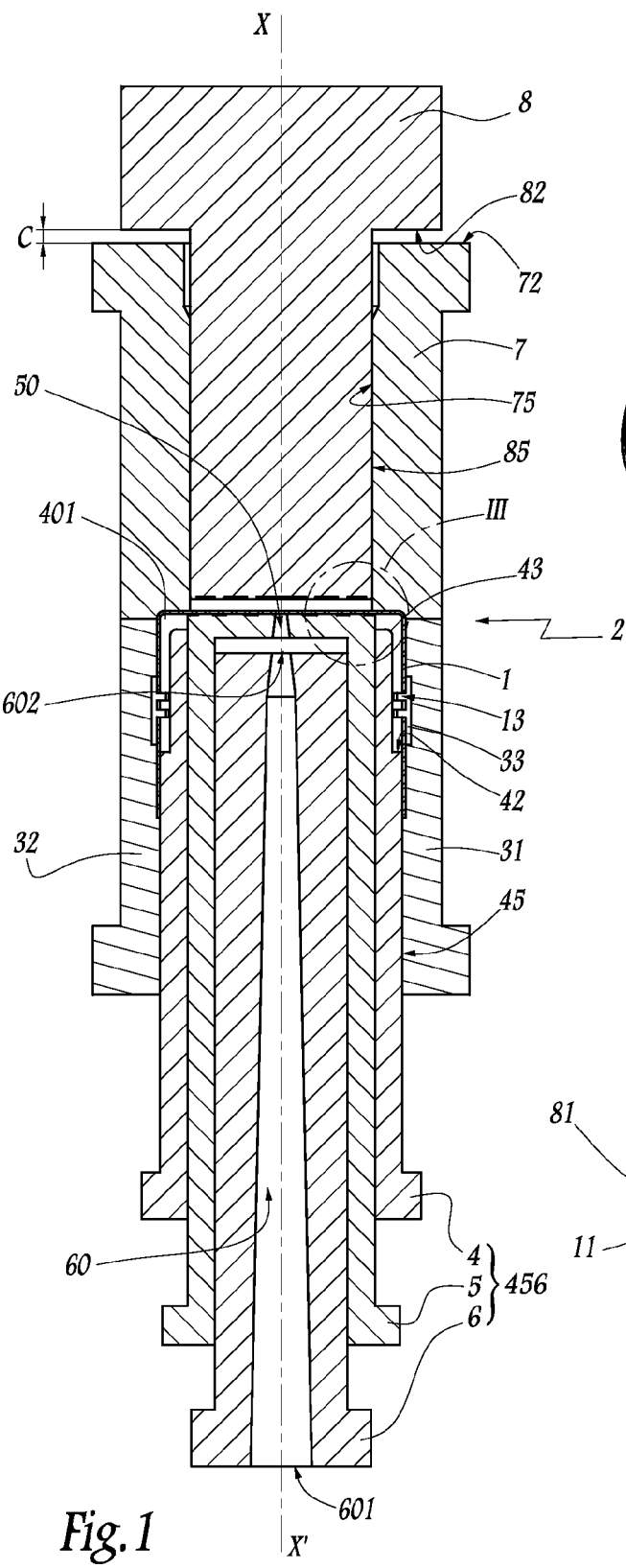
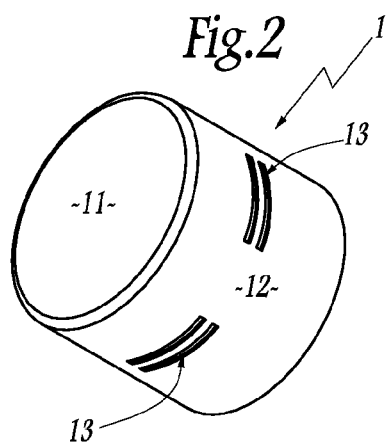
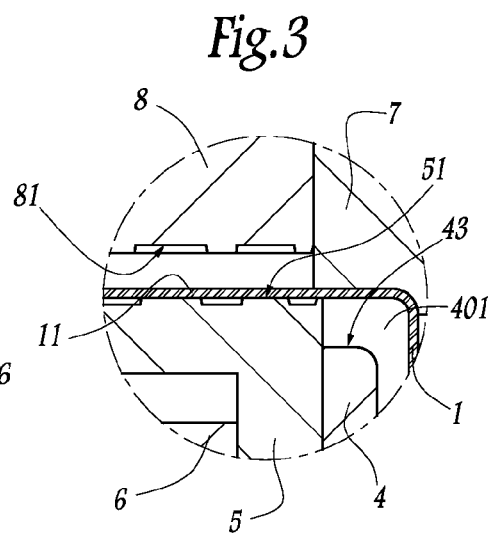
Fig.1
Fig.2
Fig.3

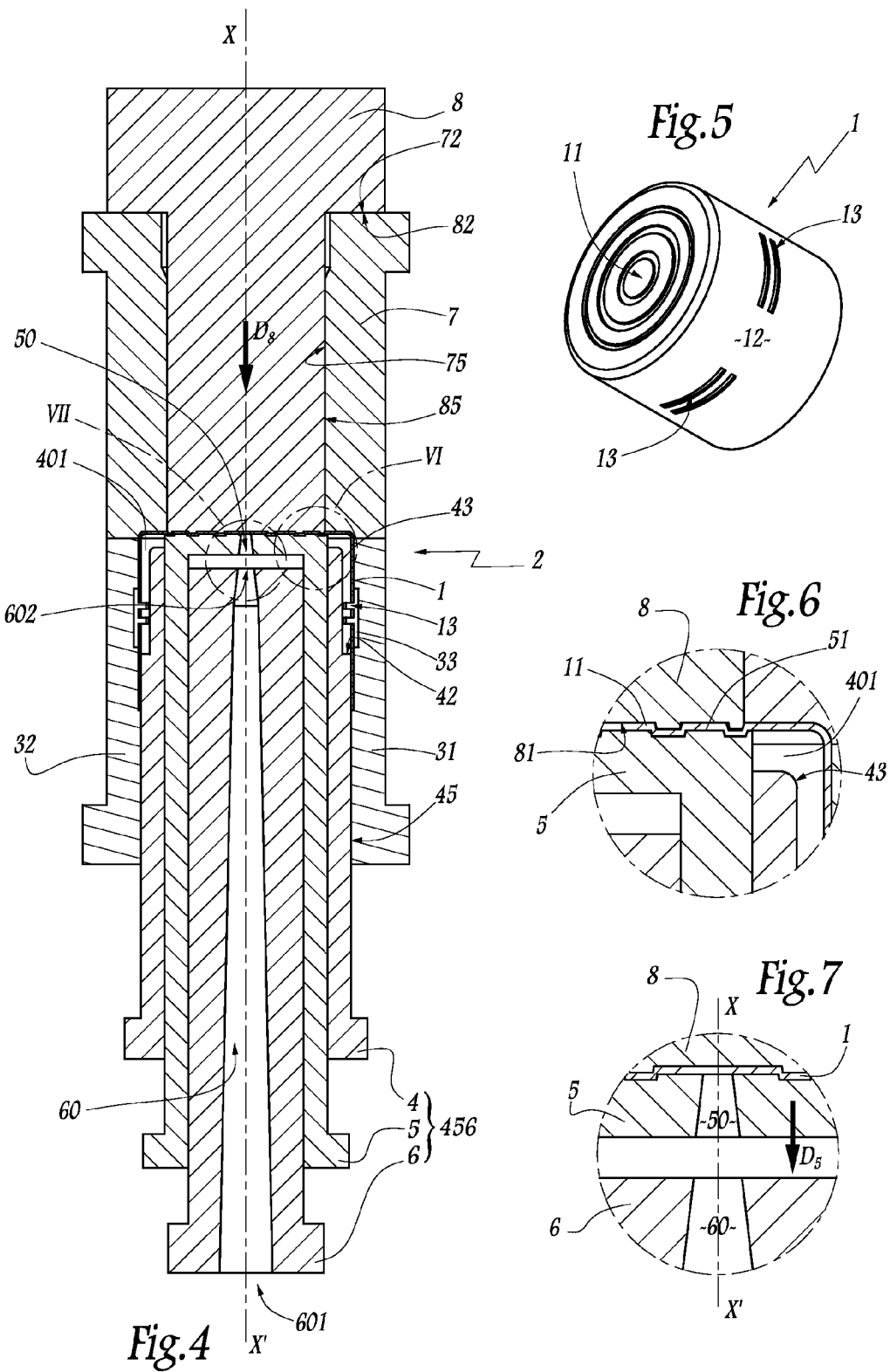

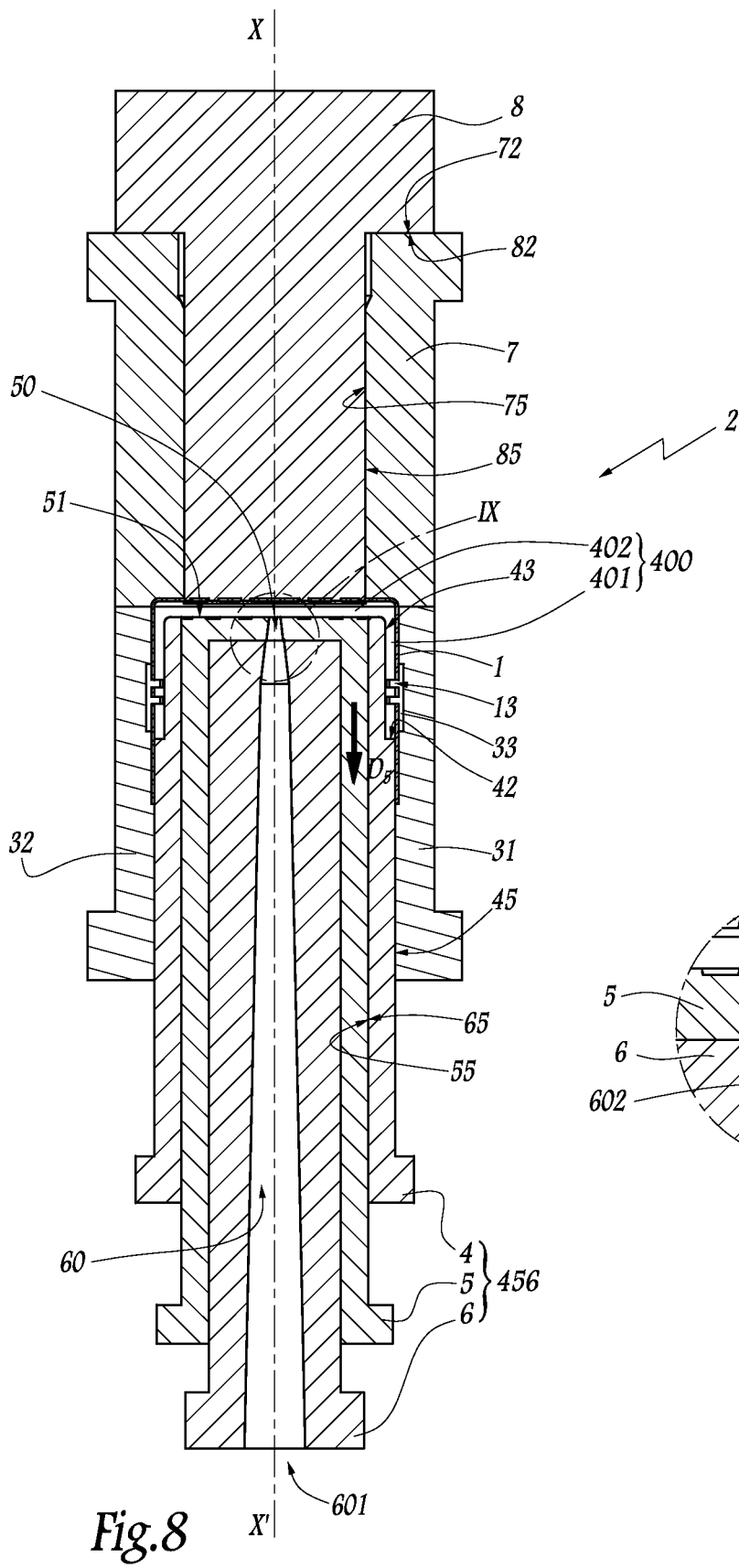
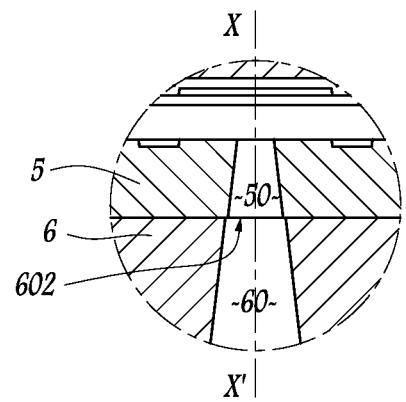
Fig.8
Fig.9

PROCESS FOR TOOLING FOR MANUFACTURE OF A COMPOSITE PART COMPOSITE STOPPER OBTAINED BY SUCH A PROCESS OR SUCH TOOLING

CROSS-REFERENCE TO RELATED APPLICATIONS

This application claims the benefit of the Sep. 28, 2007 filing date of French Application FR 07 06819, which is hereby incorporated by reference in its entirety.

This invention concerns a manufacturing process of a composite part showing a stamped body and a part in injected polymer material. Further, the invention concerns manufacturing tooling of such a composite part. The invention also concerns a composite stopper that may be obtained by such a process or such tooling.

In the field of cosmetics, bottle stoppers are sometimes used that have a hollow metal cylindrical body, whose median zone, considering its height at the cylinder's axis, is covered by a circular polymer material ribbon From prior art, a manufacturing process is known for such a composite part whereby three distinct parts are assembled, an upper and a lower part in metal and an intermediate part in polymer material.

The upper part, in aluminum for example, should be stamped before assembly, using special tooling. The intermediate part should also be manufactured before assembly and using other special tooling. For assembly, the intermediate part should be made by bi-material injection, so as to make a functional inner part for assembly, for example polypropylene, and an outer, esthetic part, for example in elastomer. Similarly, the lower part should also be manufactured before assembly and using special tooling. Then, the three parts are assembled, for example by gluing the upper part to the intermediate part and fastening, by elastic deformation, the lower part to the intermediate part.

The manufacturing process from the prior art thus requires several sets of special tooling. This tooling includes a die-stamping press to stamp the upper part, a bi-material injection mold to make the intermediate part, a die-stamping press to make the lower part and complex assembly machinery. This assembly machinery allows gluing and elastically fastening the upper and lower parts to the intermediate part. Also, this assembly machinery should allow accurate relative positioning of these parts, for example in rotating around the cylinder axis in FIG. 11, in order to coordinate the stamping motive with the motif made on the outer surface of the intermediate part. A similar positioning should be maintained and checked during the assembly of each composite part.

A disadvantage of the prior art manufacturing processes is that they use several sets of tooling and require many operations, resulting in relatively high costs. Also, there is a risk of incorrect positioning of the parts during assembly, leading for example to an angular offset between the motifs on them. This invention aims particularly to remedy these disadvantages by proposing a relatively simple manufacturing process that is less costly and is reliable.

To this effect, the subject of the invention is a manufacturing process of a composite part including at least one stamped body and at least one part in an injected polymer material, the body having a melting point substantially higher than that of the injected polymer material. This manufacturing process includes steps that involve:

placing a blank between a holder and a hollow part of a mold, such that the said hollow part forms at least one pattern cavity communicating with at least one opening going through the blank;

stamping, using a punch, a portion of the blank freed from the mold;

placing or leaving the holder in a position in which it defines with the blank at least one cavity and in which there is at least one injection runner leading to the cavity.

injecting the polymer material through the injection runner, the cavity and the opening, so as to fill the pattern cavity; and removing the composite part from the mold.

According to a first optional form of performing the process that is the subject of the invention:

the step of placing the blank consists of putting it partly on a die that is part of the holder and partly against a sleeve that is part of the holder, the die being mounted so that it slides in relation to the sleeve, a terminal surface of the sleeve defining with the blank the first part of the cavity;

the stamping step consists of compressing the blank between the die and the punch, two parts that have complementary surfaces;

the placement step consists of sliding the die in relation to the sleeve in the opposite direction to the punch and in relation to an injector including an injection channel, the die sliding in relation to the injector, to an injection position in which the die makes with the blank a second volume of the cavity, the second volume communicating with the first, and in which the mouth of the injection channel coincides with at least one orifice traversing the die, so as to form the injection runner.

According to a second optional form of performing the process that is the subject of the invention:

the steps of stamping, holding and injection are carried out concomitantly, the punch being kept immobile against the freed portion of the blank and the injection step consists of injecting the polymer material in the cavity under a pressure suitable for carrying out stamping of the blank against the punch.

According to other worthwhile but optional characteristics of the manufacturing process that is the subject of the invention, taken singly or according to any acceptable technical combination:

the stripping step consists of moving the punch away from the mold and from the composite part, of taking the composite part from the mold and of taking the composite part from the holder.

the process includes a preliminary step that consists of piercing several grooves made by punching, with no loss of material, done in the blank.

the process also includes a step consisting of coordinating the stamping motif with the pattern cavity motif, particularly during raising of the punch.

Further, the subject of the invention is a manufacturing process of a composite part including at least one stamped body and at least one part in an injected polymer material, the body having a melting point substantially higher than that of the injected polymer material. This tooling includes:

a holder suitable for receiving a body blank, the holder being suitable for defining with the blank at least one cavity, the holder having at least one injection runner leading to the cavity;

a hollow mold part forming at least one pattern cavity that communicates with at least one opening going through the blank when the blank is placed on the holder, the cavity and the pattern cavity being suitable for filling with the polymer material injected through the injection runner and the opening;

a punch suitable for stamping a portion of the blank freed from the mold.

According to other worthwhile but optional characteristics of the manufacturing tooling that is the subject of the invention, taken singly or according to any acceptable technical combination:

the holder includes a die and a sleeve, the die sliding on the sleeve, both the die and the sleeve being suitable for interacting with the distinct parts of the blank; the die and the punch having complementary surfaces, so as together to stamp the blank, and the tooling also includes an injector with an injection channel in relation to which the die slides up, the die having at least one traversing orifice suitable for coinciding with the mouth of the injection channel, so as to form the injection runner.

the tooling includes two separable parts, made up of both a blank holder fitted with the punch and the holder, with shell parts forming the hollow part of the mold.

the injection runner has a tapered part at the clearance angle, so as to facilitate extraction of the injection cores.

On the other hand, the subject of the invention is a composite stopper that may be manufactured according to the process described above and using tooling described above and that includes a body including a stamped bottom and a skirt extending transversely to the bottom. The skirt is pierced from at least one opening through which extends a quantity of polymer material forming a circular ribbon on the skirt's outer surface, the polymer material having a melting point substantially lower than that of the body.

According to other worthwhile but optional characteristics of the composite stopper that is the subject of the invention, taken singly or according to any acceptable technical combination:

the polymer material forms a ring on the inner surface of the skirt.

the body is of aluminum, preferably anodized.

the circular ribbon is made up of an elastomer, preferably a thermoplastic elastomer (TPE).

The invention will be clearly understood and its advantages will also be made evident from the following description, given as example only and referring to the appended drawings, in which:

FIG. 1 is a section of tooling that conforms to the invention represented in a position illustrating a first step of a process that conforms to the invention;

FIG. 2 is a perspective view of a metal blank in the condition it is in the step illustrated by FIG. 1;

FIG. 3 is a larger scale view of detail III of FIG. 1;

FIG. 4 is a view similar to FIG. 1 showing a second step in the process that conforms to the invention;

FIG. 5 is a view similar to FIG. 2 of the blank in the condition it is in after the step illustrated by FIG. 4;

FIG. 6 is a larger scale view of detail VI of FIG. 4;

FIG. 7 is a larger scale view of detail VII of FIG. 4;

FIG. 8 is a view similar to FIG. 4 showing a third step in the process that is the subject of the invention;

FIG. 9 is a larger scale view of detail IX of FIG. 8;

Figure 11:
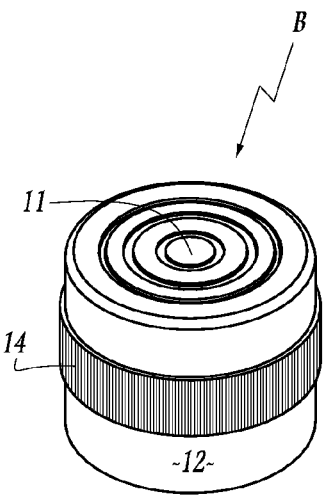
FIG. 11 is a view of a composite part, subject of the invention, manufactured according to the process illustrated in FIGS. 1 to 10, in its condition after the step illustrated by FIG. 10.

FIG. 1 shows tooling 2 allowing manufacture of a composite part such as the bottle stopper B illustrated in FIG. 11, by using the process that is the subject of the invention. Such a process includes a first step that involves placing a metal blank 1 between a holder 456 and mold shells 31 and 32. As shown in FIG. 2, the blank 1 includes a cylindrical wall 12 sealed at one end by a disc-shaped flat wall 11. After its transformation by the manufacturing process that is the subject of the invention, the blank 1 forms a body 11, 12 of the stopper B. The walls 11 and 12 are to form respectively a bottom and a skirt of this body.

In their position illustrated by FIG. 1, the shells 31 and 32 define a cylindrical bore around an X-X' axis. This bore goes through and has an overall complementary shape to that of the skirt 12. The shells 31 and 32 together define a molding pattern cavity 33 with a circular shape that extends around the X-X' axis and the skirt 12. The pattern cavity 33 faces a median portion of the outer surface 121 of the skirt 12, following its corresponding height through axis X-X'. 'Inner' refers to a surface turned towards the axis and 'outer' to a surface opposite to the X-X' axis.

The holder 456 includes a sleeve 4, of a round tubular section. The sleeve 4 has an outer radial surface 45, whose diameter corresponds, for part of its length, to that of the bore formed by the shells 31 and 32, in such a way to retain a lower part of the skirt 12. The terms 'lower' and 'upper' are used here in reference to the orientation of FIG. 1. An axial surface shows normals parallel to the X-X' axis, whereas a radial surface shows normals perpendicular to the X-X' axis.

The holder 456 also includes a die 5 in the form of a tube of axis X-X' that slides along the X-X' axis in relation to the sleeve 4. The die 5 ends in a disc-shaped wall, whose upper face 51 has a stamped motif in grooves and in raised design.

Figure 10:
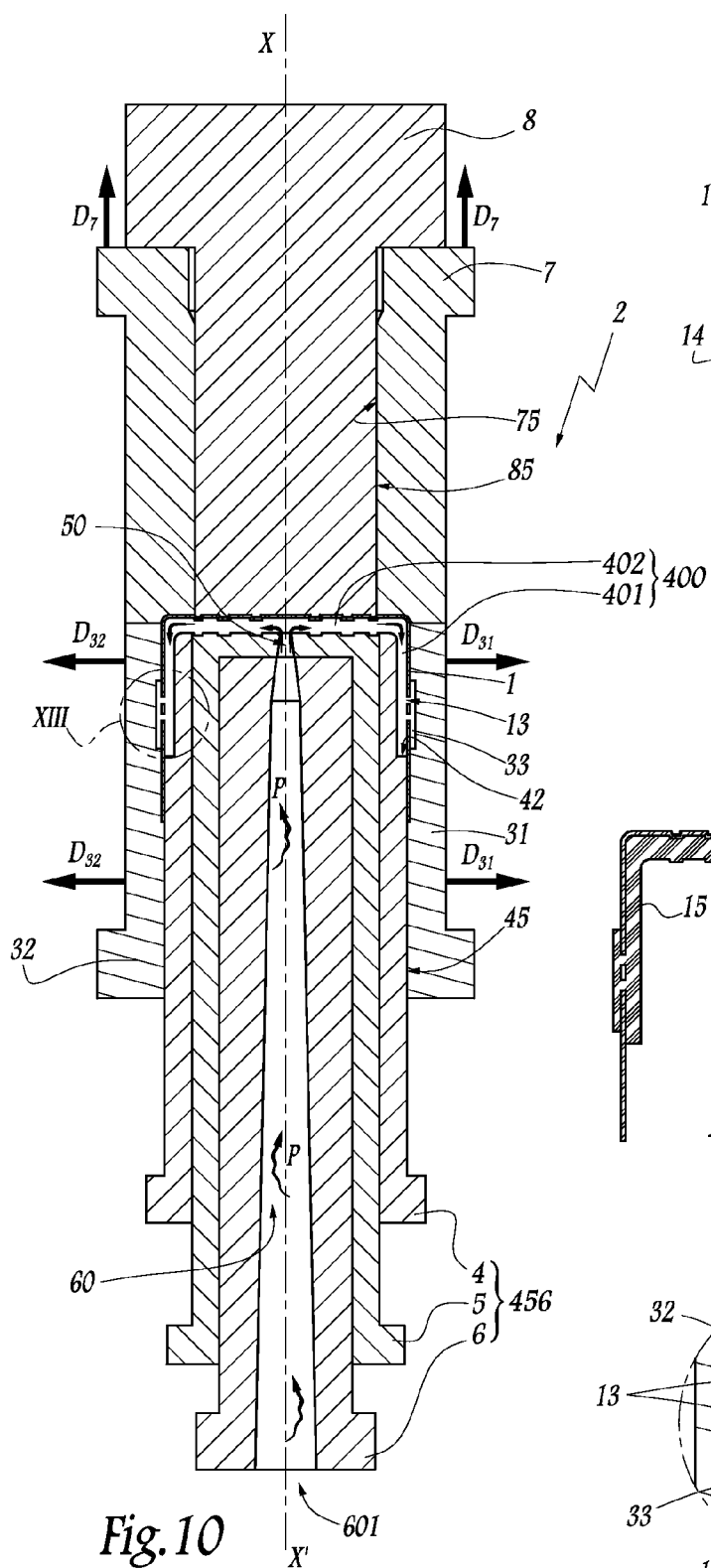
FIG. 10 is a view similar to FIG. 8 showing a fourth step in the process that conforms to the invention.

The step of placing the blank 1 shown in FIG. 1 consists of arranging the bottom 11 on the upper face 51 of the die 5 and the skirt 12 around the outside radial surface 45 of the sleeve 4. The final upper surface 43 of the sleeve 4 thus defines, with the inner surface 122 of the blank 1, an initial volume 401 of a cavity 400 as seen in FIGS. 8 and 10. This initial volume 401 is in the shape of a toroidal axis X-X', i.e. of a revolving surface generated by a circumference turning around the axis X-X' situated at its level but not passing through its center. In this case, the circumference is effectively the shape of an 'L'.

The step of placing the blank may consist of first putting the blank on the holder 456 then closing the shells 31,32 on the blank 1 or, inversely, of putting the blank 1 in the mold formed by the shells 31, 32, then placing the holder 456 against the blank 1.

The upper part of the tooling 2 includes a tube-shaped blank holder with a circular base and axis X-X'. The blank holder 7 is fixed against the upper axial face of the shells 31 and 32 and against a portion of the bottom 11 that is free of the shells 31 and 32 and that is opposite the holder 456. A punch 8 slides within a cylindrical bore 75 defined by the blank holder 7. The lower part of the punch 8 has a cylindrical radial surface 85 in addition to that of the bore 75.

As shown in FIG. 3, the lower face 81 of the punch 8 has a stamping motif in grooves and reliefs in addition to that of the upper face 51 of the die 5. According to a variation not shown, the stamping motif may be made solely on the punch or solely on the die.

The upper part of the punch 8 has a shoulder whose lower axial face 82 is at a distance C from an upper axial face 72 of the blank holder 7. The distance C corresponds substantially to the travel necessary for the punch 8 to stamp the bottom 11 against the face 51 of the die 5.

FIG. 4 shows a stamping step that follows the placing of the blank 1 and is near the blank holder 7. The stamping step consists of stamping the bottom 11 by sliding the punch 8 along the X-X' axis, as shown by the arrow $D_8$.

As shown in FIG. 6, the lower face 81 of the punch 8 comes up against the bottom 11 that it compresses against the upper face 51 of the die 5, to imprint the stamping motif. The pressure that the punch must exert on the die 5 depends on the characteristics of the blank 1, particularly its thickness and its material composition. After the step illustrated in FIG. 4, the bottom 11 is drawn as shown in FIG. 5.

Then, a placing step, illustrated by FIGS. 8 and 9, consists of placing the holder 456 in an injection position, sliding the die 5 in the X-X' axis and in relation to the sleeve 4, so as to bring the lower face of its upper wall in contact with an injector 6 belonging to the holder 456. The die 5 also slides in relation to the injector 6. The injector 6 has an outer radial cylindrical surface 65 on the X-X' axis in addition to the inner radial surface 55 of the die 5. The displacement of the die 5 occurs in the opposite direction to the punch 8, i.e. downwards in the X-X' direction, as shown by the arrow $D_5$. The die 5 and the punch 8 may be moved using hydraulic cylinders.

In this injection position, illustrated in FIGS. 8 and 9, the holder 456 defines with the blank 1 the cavity 400 through which the injectable polymer material may run. More precisely, the terminal surface 43 of the sleeve 4 defines, with a shoulder 42 of the sleeve 4, the first volume 401 with the blank 1, whereas the upper face 51 of the die 5 defines a second volume 402 with the blank 1. The first volume 401 and the second volume 402 communicate and together form the cavity 400. The sleeve 4 will thus interact with a part of the skirt 12, whereas the die 5 will interact with the bottom 11.

To inject the polymer material in the cavity 400 to the pattern cavity 33, the injector 6 of the holder 456 has an injection channel 60. The injection channel 60 goes through the injector 6 and extends along axis X-X', between an inlet 601 and an outlet 602. The channel 60 has a tapered shape with clearance angles to ease extraction of the core by the outlet 602 after the injection operation.

The upper wall of the die 5 has a traversing orifice 50 that coincides with the mouth 602 of the injection channel 60 when the holder 456 is in the injection position shown in FIG. 8. The orifice 50 unblocks in the second volume 402. In this position, the holder 456 thus has an injection runner formed by the channel 60. As shown in FIG. 9, the orifice 50 has a tapered shape inclined on the X-X' axis at the same angle as the upper extremity of the channel 60. The upper face of the injector 6 and the lower face of the die 5 are level and complementary, which makes a sealed joint of the polymer material between the die 5 and the injector 6.

To allow injection of the polymer material through the skirt 12 and to the pattern cavity 33, the blank 1 has transverse openings here in the form of grooves or notches 13 that extend the length of arcs of circles along the X-X' axis. The grooves 13 are cut with no loss of material from the skirt 12. This cutting forms kinds of bridges in the volume bounded by the blank 1 and connected to the skirt 12. These bridges thus make up reliefs to which the polymer material may attach itself after injection, which reinforces the mechanical cohesion of the polymer material on the stopper B.

As shown in FIG. 10, the injection step consists of injecting, in the cavity 400 and in the pattern cavity 33, the polymer material, whose flow is symbolized by the arrows P. The polymer material successively traverses the channel 60, the orifice 50, the cavity 400 and the grooves 13, then fills the pattern cavity 33.

Figure 12:
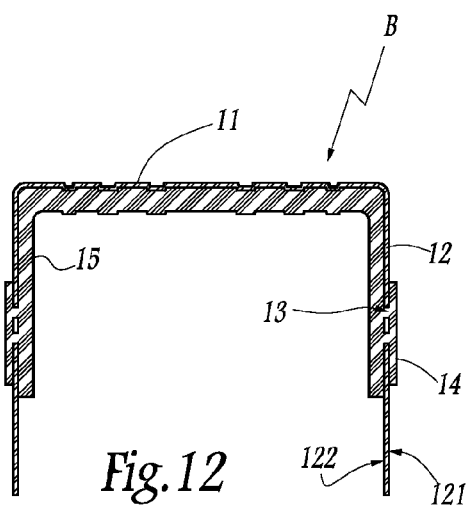
FIG. 12 is an axial section of the composite part of FIG. 11.
Figure 13:
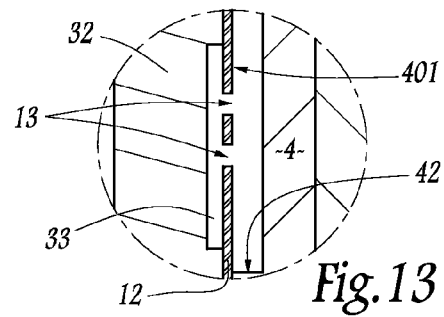
FIG. 13 is a larger scale view of detail XIII of FIG. 10.

After the injection step, the polymer material forms a circular ribbon 14 that covers the median portion of the outer surface 121 of the skirt 12. The polymer material also covers the upper portion of the inner surface 122 of the skirt 12 and it extends to here and on the bottom 11 to form a ring 15 around the interior of the stopper B. The composite cap is thus obtained with a metal body 1 and a polymer ribbon 14, as shown in FIGS. 11 and 12.

The geometry of the grooves 13 is particularly a function of the viscosity of the polymer material to be injected, of the volume of the pattern cavity 33 to fill and of the mechanical cohesion to be obtained. The oblong-shaped grooves 13, may for example be replaced by simple holes. Similarly, the position and the number of openings traversing the blank to form injection passages depends on the location where the polymer material is to be injected on the outer surface of this blank. In the example in FIG. 11, the polymer material covers a median portion of the skirt 12. However, it should rather be planned to cover the lower portion or the upper portion of the outer surface 121 with the polymer material. The position of the grooves should thus be arranged accordingly.

According to the pattern cavity 33, the ribbon 14 may have a motif such as an alphanumeric inscription. In the case where the blank 1 has not been moved on the holder 456 during the stamping and injection steps, the stamping motif is correctly coordinated with the motif on the ribbon 14, giving a satisfactory appearance. For that, the process that is the subject of the invention may include a step not shown that is consistent with coordinating the punch motif 8 with the pattern cavity motif 33. Such a step may be carried out before putting a blank 1 on the holder 456, for example during raising of the punch 8 in the blank holder. As the punch 8 is moved solely along the X-X' axis, it is not necessary to repeat this coordination step to manufacture a series of composite parts. This thus represents a time gain and a substantial reduction in rejected parts.

After the injection step, it is advisable to strip the stopper B from the mold. The stripping step consists of first moving the blank holder 7 with the punch 8, as per the arrows $D_7$ in FIG. 10, i.e. in the direction X-X', outside the shells 31 and 32. Thus is found the upper face of the bottom 11. Then the shells, 31 and 32, are separated from each other, in a radial direction shown by arrows $D_{31}$ and $D_{32}$, exposing the skirt 12.

The stopper B may thus be taken from the holder 456 using an outer tool, not shown, or under the impulse of the die 5 sliding upwards in the sleeve 4 along axis X-X'. The tooling 2 thus has two separable component parts, the blank holder 7 fitted with the punch 8 and the holder 456 with the shells 31,32.

To achieve the stripping step, it is advisable to extract, by conventional means, the injection core filling the channel 60 and the orifice 50. The tooling 2 is then ready to take a blank 1 and to implement the manufacturing process that is the subject of the invention as described above. The tooling 2 thus constitutes a hybrid tooling acting as a stamping press and an injection mold.

The materials making up the composite part 1 are chosen according to the application allotted to the part. In fact, the composite part 1 forms a bottle stopper B and the elastomer may act as a seal inside the body to the liquid contained in this bottle, an esthetic function and a function of improvement of gripping on the outside of the stopper B. However, the process and tooling that are subjects of the invention may be implemented to manufacture composite parts of various shapes and filling different functions, such as a logo, with clipping ensuring the holding of the stopper on the bottle etc.

In the example of the figures, the stopper B is made of anodized aluminum and of an elastomer, such as a thermoplastic elastomer (TPE) known for example under the brand name Thermoflex®. When the body is in anodized aluminum, appropriate measures should be taken to prevent cracking of the anodized coating.

In practice, the body may also be made of steel or of a synthetic plastic material with a melting point substantially higher than that of the injected polymer material. In practice, the injected polymer material may be made of thermoplastic. The adverb 'substantially' implies here a difference in melting points so that the synthetic plastic material neither melts nor softens at the melting point of the injected polymer material.

A second way of performing the process, subject of the invention, involves the stamping, placing and injection steps being performed concomitantly. In this alternative process, explained in reference to FIGS. 8 to 11, the punch 8 rests against the bottom 11 and the polymer material is injected in the cavity 400 under a pressure suitable for stamping the blank 1 against the punch 8. In other words, the stamping pressure to exert on the bottom 11 of the blank 1 is obtained from the injection pressure existing in the second volume 402.

This alternative process includes first of all a step involving placing the blank 1 between the holder 456 and the shells 31 and 32. This is different from the placing step illustrated in FIG. 1 in that only the lower part of the blank 1, i.e. the skirt 12, is positioned between the shells 31 and 32 and the holder 456, on its outer radial surface 45. Consequently, the bottom 11 is a distance from the holder 456 so as to form the cavity 400.

The blank holder 7 is fixed against the shells 31 and 32 and against the upper face of the bottom 11 which makes up a portion of the surface opposite the holder 456 and free from the shells 31 and 32. The punch 8 is placed in its stamping position, i.e. in contact with the bottom 11. The polymer material is then injected through the channel 60 of the injection runner 50-60, the cavity 400 and the grooves 13, so as to fill the pattern cavity 33.

The injection pressure in the second volume 402 is sufficiently high to stamp the blank 1 which is kept in contact with the punch 8. The injection pressure of the polymer material should thus be chosen according to the thickness of the bottom 11 and to the yield strength of the blank 11 material. The composite part is thus obtained, and this can be stripped from the mold in the manner previously described.

This alternative process does not require the use of a die nor of moving parts in the holder, which makes the tooling less expensive than that used for the first method of use of the manufacturing process.

According to a variation not shown, compatible with the two methods described above, the injection runner may include an elbow, to allow injection of the polymer material obliquely or perpendicular to the tooling's main direction, or the X-X' axis. Such an injection runner geometry allows the polymer material to be injected directly in the volume 401 and to limit the quantity of polymer material to inject to fill the pattern cavity 33. With such a geometry, the ring 15 does not extend to the bottom 11.

Moreover, the injection runner may be a bore in which an injection nozzle is introduced near the molding pattern cavity, which means no injection core is formed and the quantity of polymer material to inject is thus reduced.

This invention may be implemented with a multiple manufacturing tooling, allowing simultaneous manufacture of several composite parts.

The process and the tooling that are subjects of this invention require respectively few operations and few tools compared with the prior art, which allows a reduction in the price of the composite parts and an increase in the production rate.

The invention claimed is:

1. A composite stopper, comprising a body with a stamped bottom and a skirt extending transversely to the bottom, wherein the skirt is pierced with at least one opening through which extends a quantity of polymer material forming a circular ribbon that covers a portion of the outer surface of the skirt, the polymer material having a melting point substantially lower than that of the body, wherein the polymer material covers an upper portion on the inner surface of the skirt that extends above the entire portion covered by the circular ribbon on the outer surface but does not cover the entire inner surface of the skirt,
wherein the polymer material covering the upper portion on the inner surface of the skirt is configured to engage with and transversely seal a container.

2. The composite stopper of claim 1, wherein the polymer material forms a ring on the inner surface of the skirt.

3. The composite stopper of claim 1, wherein the body is made of aluminum.

4. The composite stopper of claim 1, wherein the circular ribbon is made of an elastomer.

5. The composite stopper of claim 3, wherein the aluminum is anodized.

6. The composite stopper of claim 4, wherein the elastomer is a thermoplastic elastomer (TPE).

7. A process for manufacturing the composite stopper of claim 1, the process comprising:
 a) placing a blank of the body between a support and a hollow part of a mold, such that the hollow part forms at least one pattern cavity communicating with the at least one opening, which extends through the blank;
 b) stamping, using a punch, a portion of the blank that is free from the mold to provide the stamped bottom of the body;
 c) placing or leaving the support in a position in which it defines, together with the blank, at least one cavity, and wherein at least one injection runner leads to the at least one cavity
 d) injecting the polymer material through the injection runner, the at least one cavity and the at least one opening, to fill the pattern cavity; and
 e) stripping the composite stopper from the mold,
 wherein, in addition to the stamped bottom, the body of the composite stopper comprises the skirt extending transversely to the bottom, wherein the skirt is pierced with the at least one opening through which extends the quantity of the polymer material, forming the circular ribbon that covers the portion of the outer surface of the skirt, the melting point of the polymer material being substantially lower than that of the body, wherein the polymer material covers the upper portion on the inner surface of the skirt that extends above the entire portion covered by the circular ribbon on the outer surface but does not cover the entire inner surface of the skirt, wherein the polymer material covering the upper portion on the inner surface of the skirt is configured to engage with and transversely seal a container.

8. The process of claim 7, wherein:

the step a) of placing the blank comprises placing it partly on a die of a holder and partly against a sleeve of the holder, the die being configured to slide in relation to the sleeve, wherein a terminal surface of the sleeve defines, together with the blank, a first volume of the at least one cavity;

the stamping step b) comprises compressing the blank between complementary surfaces of the die and the punch;

the placement step c) comprises sliding the die in relation to both the sleeve, in a direction opposite the punch, and to an injector including an injection channel, the die sliding in relation to the injector, to an injection position in which the die defines with the blank a second volume of the at least one cavity, the second volume communicating with the first volume, wherein a mouth of the injection channel coincides with at least one orifice crossing the die, to form the injection runner.

9. The process of claim 7, wherein steps b) to d) are performed concomitantly, wherein the punch is maintained immobile against the freed portion of the blank, and wherein the step d) comprises injecting the polymer material in the at least one cavity under a pressure suitable for stamping the blank against the punch.

10. The process of claim 7, wherein the stripping step e) comprises:

e1) moving the punch from the mold and from the composite stopper, e2) removing the composite stopper from the mold and e3) removing the composite stopper from the holder.

11. The process of claim 7, further comprising, prior to step a), forming the at least one opening by piercing the blank, with no removal of material.

12. The process of claim 7, further comprising coordinating a stamping motif with a pattern cavity motif, during setting of the punch.

* * * * *